United States Patent [19]

Korosi

[11] 3,982,932
[45] Sept. 28, 1976

[54] RECOVERY OF SILVER FROM GELATINOUS PHOTOGRAPHIC WASTES
[75] Inventor: Matyas Korosi, Montmorency, Victoria, Australia
[73] Assignee: Eastman Kodak Company, Rochester, N.Y.
[22] Filed: Aug. 22, 1972
[21] Appl. No.: 282,819

[52] U.S. Cl............................ 75/118, 75/118R, 101R; 75/108; 423/23, 42, 34, 96/50;
[51] Int. Cl............................................ C22b 11/00
[58] Field of Search ............. 75/118P; 195/3; 423/38,

[56] References Cited
UNITED STATES PATENTS
3,748,123   7/1973   Bakker.............................. 423/38 X
OTHER PUBLICATIONS
M. Sramek, Chemical Abstracts, 4715g, (1963), Vol. 59.

Primary Examiner—Oscar R. Vertz
Assistant Examiner—Ethel R. Cross
Attorney, Agent, or Firm—William T. French

[57] ABSTRACT

Silver is recovered from photographic waste liquids containing emulsified silver, silver compounds, and gelatin by reacting therewith a proteolytic enzyme while the reactants are maintained in an alkaline condition. Then the reactants are acidified to a pH of 4.2 or less by introducing an acid such as HCl or $H_2SO_4$. Precipitation of gelatin-bound silver and silver compounds occurs upon acidification, and the precipitate is allowed to settle out in a settling tank. Supernatant liquid is removed from the top, neutralized and sent to sewer. Settled sludge is removed from the bottom and silver recovered, as by incineration. The operation can be conducted either batch-wise or continuously.

9 Claims, 2 Drawing Figures

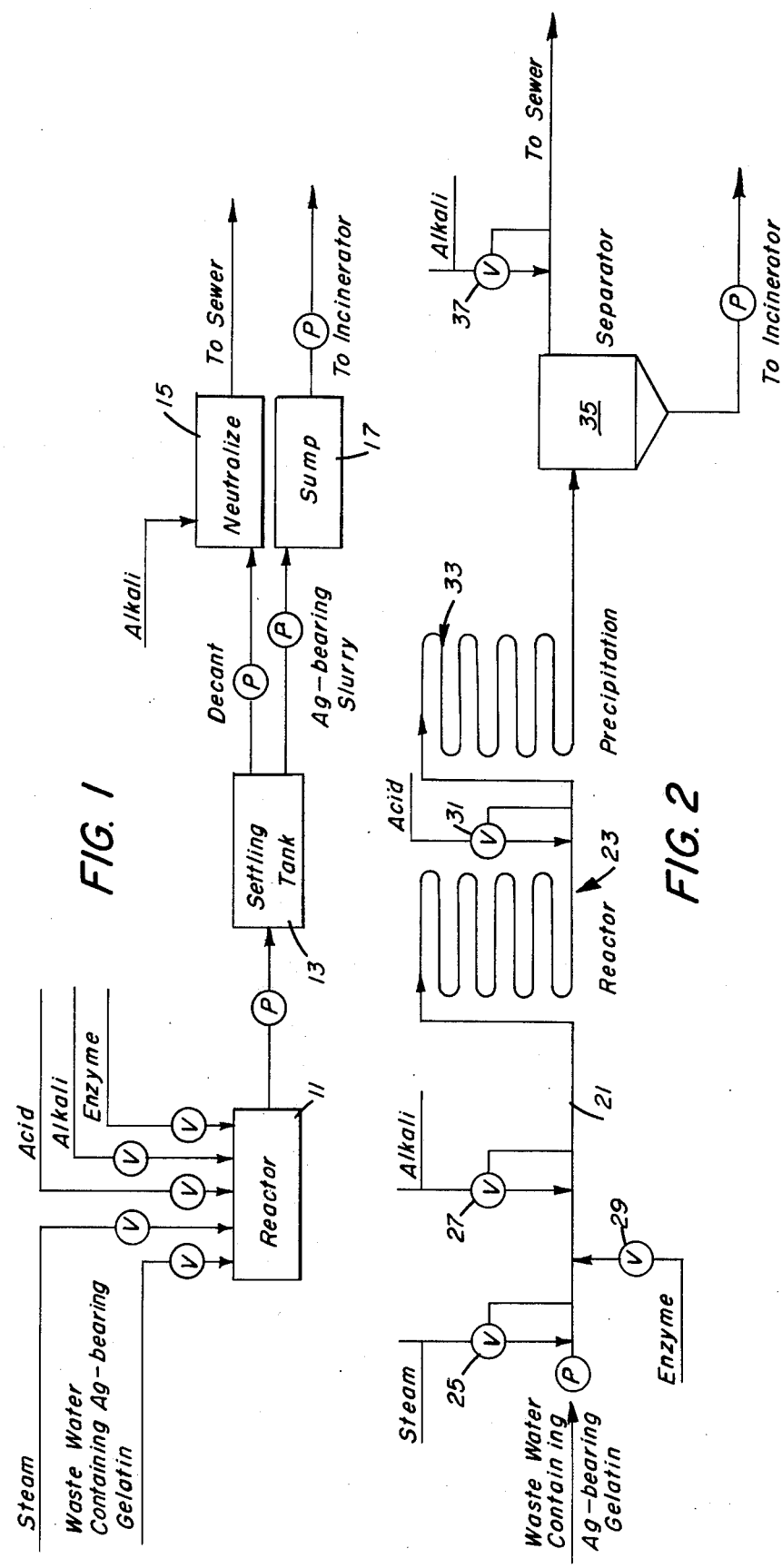

RECOVERY OF SILVER FROM GELATINOUS PHOTOGRAPHIC WASTES

BACKGROUND OF THE INVENTION

1. Field of the Invention

This invention relates to the recovery of silver from gelatinous photographic and other materials such as silver bearing gelatinous wastes, waste washing water, gelatin emulsion wastes and the like.

2. The Prior Art

In the past gelatin-bound silver has been recovered from waste washing waters from photographic processing by centrifuging. However, a typical centrifuging operation removes only about 77 percent of the silver. "Floccing" has been used in an attempt to recover the remainder, or at least a significant part thereof, but known floccing methods often make it necessary to handle uneconomically large volumes of liquids. Furthermore, the quantity of flocculent must be substantially commensurate with the gelatin content of the wastes for best silver retention. Under these conditions the "floc" will contain a considerable proportion of alumina waste that makes its presence felt during the smelting operation.

In U.S. Pat. No. 1,065,115 there is described a procedure wherein photographic film is treated with enzymes such as pepsin, trypsin or papain to remove the gelatin from the film base which is then recovered. The metallic silver and silver salts are then said to be collected. I have found that this procedure does not accumulate the silver in a sufficiently concentrated form, nor does the silver settle out of the aqueous liquid to an acceptable silver concentration. Also, the decanted supernatant liquid contains more silver compounds in solution than one wants to lose, typically about 100 ppm.

SUMMARY OF THE INVENTION

An object of this invention is to provide an improved method of precipitating silver out of silver-bearing gelatinous wastes and collecting it in high concentration without the need to centrifuge, to add flocculents (although under certain conditions this can be done advantageously in minute quantities); or to carry out any other operations requiring the handling of relatively large quantities of liquid.

For the purpose of the present specification "gelatin" and "gelatinous" include gelatin and all other proteinaceous materials.

With this object in view, the invention in a preferred form includes the steps of adding a proteolytic enzyme to a suspension containing gelatin-bound silver bearing substances to have the enzyme react with the gelatin molecules to cause them to break down into soluble peptide units. Rapid settling and accumulation of the silver and silver compounds are then accomplished by maintaining suitable conditions for precipitation, and formation of a supernatant liquid.

By the use of proteases such as, for example, endopeptidase, the initial enzymatic reaction is carried out at an alkaline pH, and precipitation of the silver components is subsequently accomplished by adding acid to reduce the pH to an acid value, for example, less than 4.2.

THE DRAWINGS

In the drawings:

FIG. 1 is a schematic flow sheet of apparatus for conducting a batch type embodiment of the invention; and FIG. 2 is a schematic flow sheet of apparatus for conducting a continuous embodiment of the invention.

THE PREFERRED EMBODIMENTS

In a preferred practical embodiment of the invention, an aqueous solution or suspension (hereinafter called a liquid) containing emulsified silver metal or silver compounds, for example the waste washing water from photographic emulsion manufacture, or photographic gelatin emulsion removed from scrap film, is treated with proteolytic enzyme material in a reactor tank 11 containing 2,000 gallons of the liquid. Steam is injected into the liquid until the temperature reaches 50°C and the pH is then adjusted to about 8 by introducing an aqueous alkali such as NaOH or KOH. Approximately 5 ppm (parts per million by weight) of a proteolytic enzyme is added, and the mixture is allowed to digest for approximately one-half hour at 50°C. This treatment is of specific value when using an enzyme active under alkaline conditions such as sold under the trademark Bioprase as will be described in more detail hereinafter.

Many proteolytic enzymes may be used. In each case the pH of the liquid is adjusted to the optimum range for the enzyme used.

If the optimum pH for the enzyme treatment happens to be below 4.2, eg. for an enzyme active under acid conditions such as sold under the trademarks Bromelain, Denapsin, then no further adjustment in pH is generally required and precipitation of silver bearing substance will proceed during the enzyme treatment, and sedimentation begins immediately. Examples of such enzymes will be described hereinafter. Although this presents a greatly simplified version of the isoelectric precipitation process, it lacks the good reliability of the Bioprase process and economically (as far as the cost in enzymes is concerned) is more expensive at present, with greatly increased time for enzyme action and sedimentation being required.

The reaction mixture containing Bioprase still being in the reactor tank 11, the pH is lowered to a value below 4.2, such as between pH 4.2 and pH 2.5, and preferably about 3.5, by acid addition such as 98 percent undiluted sulphuric acid of which one-half to 1 litre may be added per 2,000 gallons in the reactor. During the acid addition the contents of the reactor are continuously stirred by a suitable pump. A fine precipitation is observed within one minute, and coalescing gradually increases the size of the flakes. The time allowed for this operation is about 10 minutes, after which the contents of the tank are pumped into a 10,000 gallon settling tank 13. The complete cycle for the reactor treatment occupies about 1 ½ hours.

Several reactor tanks and settling tanks can be used alternately and successively. The sedimentation achieved by the invention is found to be quite rapid. After 4 hours of settling the residual silver content in the supernatant liquid seldom exceeds 4 ppm, and after overnight settling it is generally less than 2 ppm and is often small enough to escape detection. The supernatant liquid is therefore ready for decantation and discharge into the sewer, although before doing so its pH may have to be raised to about 7 by introducing aqueous alkali such as NaOH or KOH in a drip-feed neutralizer 15 to comply with sewerage regulations. In a typical case the discharge to sewer contains about 0.2 percent gelatin, 0.1 percent salt and less than 1 ppm of silver.

The wet precipitate slurry is collected in a sump 17 from the bottom of settling tank 13 (and also from reactor 11 when present therein) after a sufficient quantity has accumulated. The wet precipitate is then injected into an incinerator as one way of recovering its silver content.

The solids content of the precipitate before incineration consists of approximately 33 percent by weight of silver in metal or halide form, and of about 60 percent of gelatin.

Emulsion waste which has been removed from scrap film may be mixed into waste washing waters in the reactor tank 11 in any desired proportions, e.g., 100 gallons emulsion mixed into the 2,000 gallons in the reactor.

The initial pH adjustment in the reactor 11 may be effected by a 46 percent aqueous sodium hydroxide solution. The sewer neutralizer added at 15 may be 35 percent aqueous sodium hydroxide solution diluted with 3 parts $H_2O$ per 1 part of solution. Approximately 1 to 2 litres are used for each 2,000 gallon batch in the reactor 11, and about 3 litres per 10,000 gallons of discharge into the sewer.

Regarding the enzyme, about 5 to 10 ppm may be used for waste washing waters, and 10 to 50 ppm when 1 part of emulsion has been mixed in 20 parts of waste washing waters. Preferably the temperature is 48°C to 52°C and the pH 7.0 to 10.6 when the enzyme is added. The volume of precipitate sludge may be one two-hundredth of the volume of the original waste liquor.

The preferred proteolytic enzyme for performing the process comprises endopeptidases, i.e. proteases which attack the central bonds of protein molecules. A suitable commercially available enzyme of this kind is sold under the trademark Bioprase by Nagase & Co., Ltd. of Osaki and Tokyo, Japan. Bioprase is reported by Nagase to be a bacterial proteolytic enzyme preparation which is obtained by establishing a submerged culture of a strain of *Bacillus subtilis*, followed by harvesting, concentrating and purifying of the enzyme. Bioprase is available in concentrations of 10,000; 50,000 and 150,000 P.U.N. (Proteolytic Units of Nagase) per gram (1 P.U.N. is defined as the amount which acts on milk casein for 1 minute at 30°C and produces a quantity of Folin color producing substances, not precipitated by trichloracetic acid, that is equivalent to 1 gamma of tyrosine). It is available in dry powder form and is readily soluble in water. The 50,000 P.U.N. Bioprase product is available in two grades, PN–10 (purified) and SP–10 (highly purified).

Other proteolytic enzymes that can be used in my process are trypsin, pepsin, and, in order of descending activity, pancreatin, ficin, bromelain (derived from the pineapple plant, and available from Marschall Division of Miles Laboratories, Inc. Elkhart, Ind.), and a protease active in acidic media sold under the trademark Denapsin by Nagase (a fungal acid-stable enzyme, obtained by tray culture of Rhizopus, extraction and purification.

Bromelain is active on protein at neutral, acid and alkaline pH.

Denapsin is active on protein at pH 2.5 to 5.5 Bioprase and pancreatin are active at pH larger than 7 and are preferred.

EXAMPLE 1

Reactor tank 11 is filled with 2,000 gallons of waste wash waters from photographic emulsion manufacture containing 130 ppm of silver and steam is injected until the temperature is 50°C. Then 46 percent sodium hydroxide is added until the pH is raised to 8, at which point 5 ppm of Bioprase PN–10 is introduced in aqueous solution and digestion proceeds for 15 minutes.

Sulfuric acid (98 percent) is then added in tank 11 until pH is reduced to 3.5, the isoelectric point, and a fine precipitation begins within 1 minute. After 10 minutes the tank contents are pumped into a settling or sedimentation tank 13. After settling for 24 hours the silver content of the supernatent liquid is less than 1 ppm. The supernatent liquid is pumped to tank 15 where it is neutralized with aqueous NaOH to pH 7 and then discarded.

The slurry in the bottom of tank 13 contains, on a dry weight basis, 23 percent silver (in metal and halide form) and 60 percent gelatin, and is pumped to sump 17, and then injected into an incinerator where the water is vaporized and silver-bearing ash is formed.

In order to demonstrate the improved results with my invention I conducted batch type operations using the enzyme treatment of Danzer U.S. Pat No. 1,065,115 without acidification, and the technique of my invention wherein the alkaline reacted material was acidified to a pH of about 4 after enzyme action was complete, to improve precipitation and settling of the silver metal and silver compounds.

EXAMPLE 2

|  | Danzer (Enzyme Treatment) | The Invention (Enzyme Treatment followed by isoelectric precipitation) |
|---|---|---|
| Enzyme used | Trypsin | Trypsin |
| Silver concentration in digested slurry | 297 ppm | 297 ppm |
| Silver concentration in supernatant liquid after: |  |  |
| 5 hours | 210 ppm | 180 ppm |
| 24 hours | 90 ppm | 115 ppm |
| 144 hours | 65 ppm | 53 ppm |

EXAMPLE 3

|  | Danzer (Enzyme Treatment) | The Invention (Enzyme Treatment followed by isoelectric precipitation) |
|---|---|---|
| Enzyme used | Bioprase | Bioprase |
| Silver concentration in slurry | 278 ppm | 278 ppm |
| Silver concentration in supernatant liquid after: | | |
| 5 hours | 285 ppm | 3.5 ppm |
| 24 hours | 103 ppm | 0.4 ppm |
| 144 hours | 73 ppm | 0.1 ppm |

Example 3 emphasizes the startling improvement obtained with Bioprase in the process of the invention. However, Example 2 does demonstrate a definite improvement with trypsin. Furthermore, I have found that in my process practised with trypsin, all of the silver settled out on prolonged standing whereas in the Danzer process with trypsin satisfactory settling of silver was not observed on prolonged standing (4 weeks) and some resorbing of silver appeared to have occurred.

As presently understood, the theory underlying this process is as follows: Proteins such as gelatins, other polypeptides, peptides and amino acids are ampholytes. Having both acidic and basic functional groups they are able to form internal salts (betains) at a pH value specific for each individual compound. At this pH value the ionization of the compound is at its minimum. This pH value is called their "iso-electric" point or range. For some ampholytes at the isoelectric point the electrical charge on the surface of the molecule becomes zero. In the form of their internal salts such proteins as gelatin molecules lose their ability to form dispersions and will precipitate. For other ampholytes the formation of inner salts is not complete, it reaches a degree which is not sufficient to allow precipitation. Indiscriminate breakdown of gelatinous matter may produce protein fragments of the latter type in which the internal neutralization of the functional groups remains incomplete.

The present isoelectric precipitation process uses the principle of isoelectric precipitation by selecting enzymes that break down and fragment gelatins at linkages in the center of the molecule, producing precipitable peptides containing encapsulated silver and silver compounds. After the breaking down of the gelatin under e.g. alkaline or acid conditions, the pH is purposefully adjusted to the isoelectric point or range in order to bring about rapid coagulation or conglomeration of peptides and rapid precipitation and settling (within a few hours) leaving as little as less than 1 ppm of silver in the supernatant liquid.

As it happens the best proteolytic enzymes such as Bioprase and pancreatin (proteases active in alkaline medium) that produce the largest proportion of precipitable fragments have their optimum working range at high alkaline pH values. The isoelectric point or range for precipitation is at low pH values. To satisfy the different requirements of pH conditions the addition of enzyme to the waste liquids is followed by the addition of caustic, and after enzyme action is complete the addition of acid follows. All three process steps, the addition of enzymes, caustic and acid represent applications of the isoelectric principle.

Although the process, due to inherently long precipitation times (usually about 4 hours) and settling times (usually about 4 to 16 hours) is basically a batch process, my process is also amenable to continuous operation, as shown in FIG. 2.

Referring to FIG. 2, the liquid containing gelatin and silver metal or compounds flows continuously through a conduit 21 to a reactor 23 comprising a series of return-bend pipes which provide sufficient time for enzymatic reaction to occur. Enzyme solution, steam, and alkali solution are all continuously introduced into conduit 21. Steam is automatically controlled in response to temperature by a thermostatically controlled valve 25. Alkali is automatically controlled by a pH responsive valve 27. Valve 29 is present to introduce enzyme solution by manual or automatic control at the proper rate correlated with the rate of fluid flow.

After leaving reactor 23 acid solution is continuously introduced into the flowing fluid by way of a valve 31 actuated automatically in response to pH of the fluid, to reduce pH to the desired value of 4.2 or less.

The fluid then enters a precipitator 33 comprising a series of return-bend tubes wherein precipitation is completed and a slurry is formed.

The slurry then flows into a settling tank 35 (several can be used successively) in which the velocity of flow is greatly reduced to permit precipitated solids to settle to the bottom. Supernatent liquid is removed from the top, is neutralized by alkali solution introduced through a pH responsive valve 37, and is then discharged to the sewer.

A settled slurry concentrate is periodically removed from the bottom of separator 35 and silver recovered, as by incineration.

This isoelectric precipitation process may have application in metallurgical fields where a selective emulsification of ore from waste can be achieved by gelatin; in water pollution treatment of gelatinous wastes (e.g., in abattoirs); and in the food industry for clarification of fermented beverages.

The invention has been described in detail with particular reference to preferred embodiments thereof, but it will be understood that variations and modifications can be effected within the spirit and scope of the invention.

I claim:

1. A process for recovering silver in the form of silver metal or compounds from waste wash waters of emulsion manufacture comprising:
    mixing with said wash waters a proteolytic enzyme endopeptidase which is a bacterial enzyme prepared from *Bacillus subtillis* and which is further characterized by the ability to react with gelatin to produce a peptide, maintaining said wash waters at an alkaline pH during reaction of said enzyme therewith;

introducing acid into said wash waters in sufficient amount to develop an acid pH corresponding to the isoelectric point thereby to effect the precipitation of silver metal or compounds and forming a supernatant liquid, and separating a concentrate of silver metal or compounds and said supernatant liquid from one another.

2. A process in accordance with claim 1 wherein said acid is introduced in sufficient amount to develop a pH of 4.2 to 3.5 in said liquid.

3. A process in accordance with claim 1 wherein said acid is HCl or $H_2SO_4$.

4. A process in accordance with claim 1, also comprising adding alkaline material to said supernatant liquid after said separating step in sufficient amount to neutralize acid therein, and then disposing of said supernatant liquid.

5. A process in accordance with claim 1, also comprising heating said liquid and maintaining the temperature thereof between about 48°C and about 52°C during reaction of said enzyme therewith.

6. A process in accordance with claim 1, conducted as a batch operation.

7. A process in accordance with claim 1 conducted as a continuous operation by introducing said enzyme, and said alkali into a flowing stream of said liquid, passing said flowing stream through an elongated reaction zone and completing the enzyme reaction therein, acidifying said flowing stream, and passing the acidified flowing stream through an elongated precipitation zone.

8. A process according to claim 1 wherein the pH is adjusted to about 3.5.

9. A process according to claim 1 wherein said alkaline pH is maintained by aqueous NaOH or KOH.

* * * * *